United States Patent
Umebayashi et al.

[11] Patent Number: 5,952,074
[45] Date of Patent: *Sep. 14, 1999

[54] MAGNETIC RECORDING MEDIUM

[75] Inventors: Nobuhiro Umebayashi, Tsukuba; Teruhisa Miyata, Otokuni-gun, both of Japan

[73] Assignee: Hitachi Maxell, Ltd., Ibaraki-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/510,456

[22] Filed: Aug. 2, 1995

[30] Foreign Application Priority Data

Aug. 3, 1994 [JP] Japan ..................... 6-202867

[51] Int. Cl.⁶ ............................................ G11B 5/82
[52] U.S. Cl. ................. 428/65.3; 428/141; 428/694 BS; 428/694 BR; 428/900; 360/135
[58] Field of Search ................... 428/141, 65.3, 428/694 BS, 694 BR, 900; 360/135

[56] References Cited

U.S. PATENT DOCUMENTS

| | | | |
|---|---|---|---|
| 4,633,451 | 12/1986 | Ahn et al. | 369/14 |
| 4,961,123 | 10/1990 | Williams et al. | 360/131 |
| 5,256,481 | 10/1993 | Miyake et al. | 428/336 |
| 5,355,270 | 10/1994 | Umebayashi et al. | 360/135 |
| 5,430,594 | 7/1995 | Umebayashi et al. | 360/131 |

FOREIGN PATENT DOCUMENTS

| 5205260 | 8/1993 | Japan. |
|---|---|---|
| 5314470 | 11/1993 | Japan. |

Primary Examiner—Stevan A. Resan
Attorney, Agent, or Firm—Birch, Stewart, Kolasch & Birch, LLP

[57] ABSTRACT

A magnetic recording medium wherein thickness of the magnetic layer is less than the wavelength of projected light onto the surface of the magnetic recording medium having a multiplicity of magnetic-head tracking recesses formed thereon at predetermined intervals, and data tracks for recording thereon predetermined information provided between every two adjacent magnetic-head tracking recesses, each tracking recess and data track having a function to track a magnetic head in accordance with reflected light from the magnetic-head tracking recesses, the data tracks being provided at a track density greater than 1000 TPI and light transmittance of the magnetic recording medium is less than 5%.

3 Claims, 6 Drawing Sheets

Prior Art

MAGNETIC RECORDING MEDIUM

BACKGROUND OF THE INVENTION

1. Field of the Invention

The present invention relates to a magnetic recording medium and a method of manufacturing the same. More particularly, the present invention relates to a magnetic recording medium having excellent electromagnetic characteristics, such as overwrite characteristics, and to a magnetic recording medium having high operational reliability provided with magnetic head tracking recesses capable of optical tracking of a magnetic head, and capable of effectively suppressing interference, due to the thickness of a magnetic layer, of reflected light to be used for servo tracking purposes.

2. Description of the Related Art

In recent years there has been a great need to increase the density of magnetic recording media and develop their capacity by increasing their linear recording density in order to realize expedient and inexpensive large capacity floppy disks. In the magnetic recording media manufactured by applying a magnetic coating material formed of a magnetic powder, binder resin, organic solvent and other necessary constituents onto a flexible substrate, such as a polyester film, and drying the material, setting the thickness of the magnetic layer as thin as possible is desirable to increase the liner recording density. When high density data tracks are laid out on a thin magnetic layer, smaller and larger capacity media are being developed due to an increase in track density by use of a technology which secures precise tracking by the placement of precise concentric markings and their detection as well as by an increase in liner recording density.

As seen in FIGS. 10 and 11, there are illustrated an enlarged sectional view and a plan view, respectively, of the essential portion of a conventional floppy disk of the above-mentioned type. As shown in these figures, a magnetic layer 101 is provided on the surface of a base film 100, with grooves 102 used for tracking servo formed in the magnetic layer 101 so as to extend in the direction of the rotation of a floppy disk, and a data track 103 formed between every two adjacent grooves 102. A tracking servo light beam 104, shown in FIG. 10, is projected onto the surface of such a floppy disk from a light-emitting element (not shown) provided in a magnetic recording and reproducing apparatus. Light 105 reflected by the surface of the floppy disk is received by each of light-receiving elements 106a, 106b, 106c and 106d separately provided in the magnetic recording and reproducing apparatus, as shown in FIG. 11. As the light intensity reflected on the data tracks 103 is different from that reflected on the grooves 102, the total output value of light-receiving elements 106a and 106b is constantly compared with that of the light-receiving elements 106c and 106d. Then, tracking servo of the magnetic head is performed so that both of the output values of these elements become equal.

However, in such a system it has been determined that relative tracking accuracy is rapidly degraded if the magnetic layer is under a certain thickness and the track density is increased over 1000 TPI. Furthermore, in studying the causes of this disadvantage, it has been found that the effect of optical noise on the tracking accuracy is remarkable when the track density is increased over 1000 TPI, which was not the case under 1000 TPI. It has also been determined that such an effect becomes remarkable especially over 2000 TPI.

In a conventional floppy disk having such magnetic head tracking recesses, the tendency has been to make the magnetic layer thinner as the recording density is increased. However, in such a medium the servo light projected on the surface of the magnetic layer is not 100% reflected on the surface of the magnetic layer. Part of the servo light is reflected inside the magnetic layer and on the surface of the substrate after it passed through the magnetic layer. Furthermore, the reflected light is likely to be affected by the varied magnetic layer thickness, and when the light reflected on the surface of the magnetic layer interferes with the other reflected light, the dispersion of the reflectivity becomes large, which causes a problem leading to improper magnetic-head tracking. Especially, when such a problem arises, there is a relationship between the magnetic layer thickness and the wavelength of the projected light. Optical noise is caused when any light other than the regular light reflected on the surface of the magnetic layer enters the servo sensors, and it has been found that the noise becomes remarkable when the thickness of the magnetic layer is under a certain level.

Also, it has been determined that among the media with the magnetic layer set under a certain thickness, when the disks have light transmittance of more than 5%, the optical noise becomes remarkably large and optical servo tracking can not be properly performed over 1000 TPI. Furthermore, in such media if the center line average roughness of the magnetic layer Ra is over one fiftieth of the wavelength of the projected light, optical servo tracking can not properly performed over 1000 TPI because the reflected light is scattered.

SUMMARY OF THE INVENTION

It has been determined that in a magnetic recording medium having a magnetic layer under a certain thickness and further using optical servo of over 1000 TPI of track density, it is important not to control variations of the magnetic layer thickness, but to suppress the servo light entering into and reflected inside the magnetic layer after the servo light is projected on the surface of the magnetic layer or the servo light passes through the magnetic layer and is reflected on the surface of the substrate. A plan has been devised in which because of a light transmittance of less than 5%, preferably less than 3%, set with the disks having the magnetic layer, the optical noise is suppressed and optical servo tracking is properly performed at more than 1000 TPI, and at even more than 2000 TPI of higher track density.

The invention lies in the media in which an undercoat layer including non-magnetic powder and binder resin is provided on at least one surface of the substrate, and any powder or resin which absorbs projected light is mixed in the magnetic layer. Further, the magnetic layer thickness is made thinner than the wavelength of the projected light and thus the electromagnetic characteristics, such as overwrite, resolution, etc. are improved while at the same time a great many of magnetic-head tracking recesses are formed at predetermined intervals on the surface of the magnetic layer. When light is projected on the magnetic-head tracking recesses and data tracks, the interference of the reflected light for tracking servo due to the variation of the thinner magnetic layer is suppressed. The surface roughness of the magnetic layer is made less than one fiftieth of the wavelength of the projected light and the scattering of the light is suppressed so that the adequate magnetic-head tracking takes place. The magnetic-head tracking recesses can be formed by burning the magnetic layer using a laser and decomposing and scattering the binder, or by imprinting a specified pattern on the surface of the magnetic layer using a stamper.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
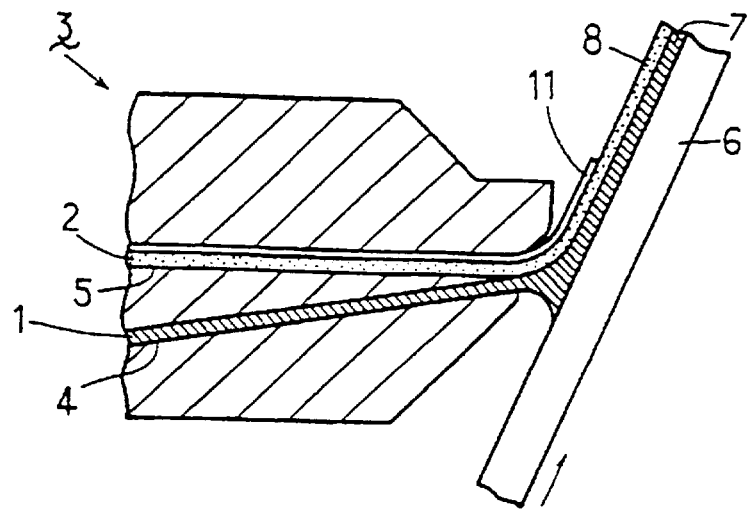
FIG. 1 is a sectional view illustrating the essential portion of an extrusion type coating head used in the present invention.
Figure 2:
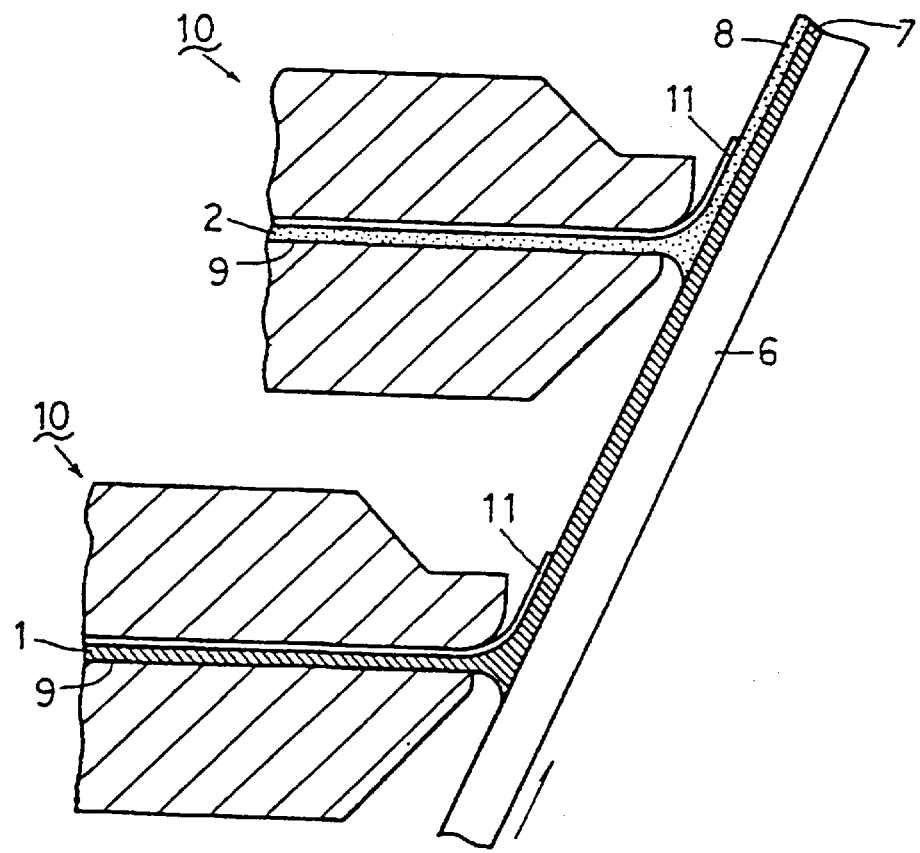
FIG. 2 is a sectional view illustrating the essential portion of another extrusion type coating head used in the present invention.

The preferred embodiments of the present invention will be explained as follows with reference to the accompanying drawings. FIGS. 1 and 2 show a method of simultaneously coating an undercoat layer and a magnetic layer on a flexible substrate. In FIG. 1, a coating material 1 containing non-magnetic powder and resin, which is applied as the undercoat layer, and a magnetic coating material 2 containing magnetic powder and binder resin are simultaneously discharged and coated onto a traveling base film 6 from slits 4 and 5 of an extrusion type coating head 3 so that an undercoat layer 7 and a magnetic layer 8 are formed, stacked one on top of the other.

In FIG. 2, two extrusion type heads 10 having a slit 9 are disposed side by side. The coating material for the undercoat layer 1 containing non-magnetic powder and binder resin and the magnetic coating material 2 containing magnetic powder and binder resin are simultaneously discharged and coated onto the traveling base film 6 so that the undercoat layer 7 and the magnetic layer 8 are formed, stacked one on top of the other. A flexible member 11 smooths the coated magnetic layer 8. In this way, the undercoat layer 7 and the magnetic layer 8 can be formed by simultaneously applying the coating material for the undercoat layer 1 and the magnetic coating material 2, one on top of the other and, in addition, the undercoat layer 7 and the magnetic layer 8 can be also formed in such a way that after the undercoat layer is dried, the magnetic coating material is coated thereon and dried by conventional gravure coating. The magnetic layer 8 having excellent characteristics, having a thickness of less than the wavelength of the projected light for optical servo-tracking, is formed on the base film, with the undercoat layer 7 provided therebetween. Thus, a magnetic recording medium having excellent electromagnetic characteristics of sufficiently improved overwrite or resolution characteristics, and sufficiently low optical noise and excellent tracking accuracy can be formed.

Figure 3:
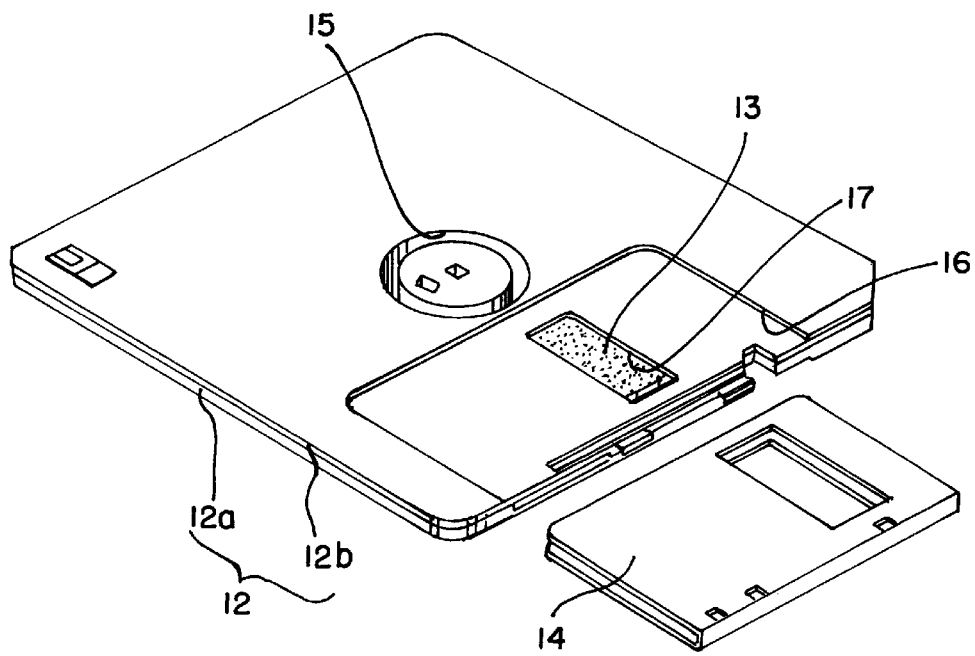
FIG. 3 is an exploded perspective view illustrating a magnetic disk cartridge in which a floppy disk of the present invention is housed.
Figure 4:
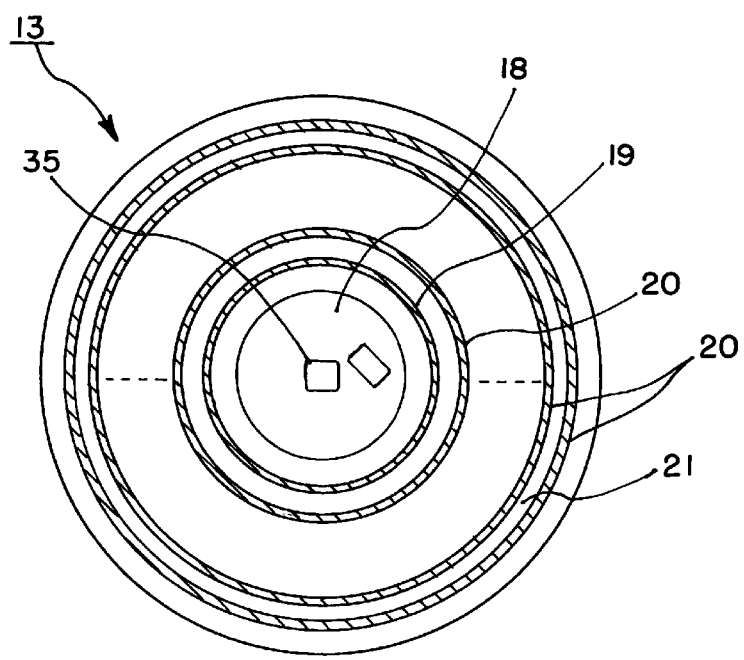
FIG. 4 is a plan view of the floppy disk of the present invention.
Figure 5:
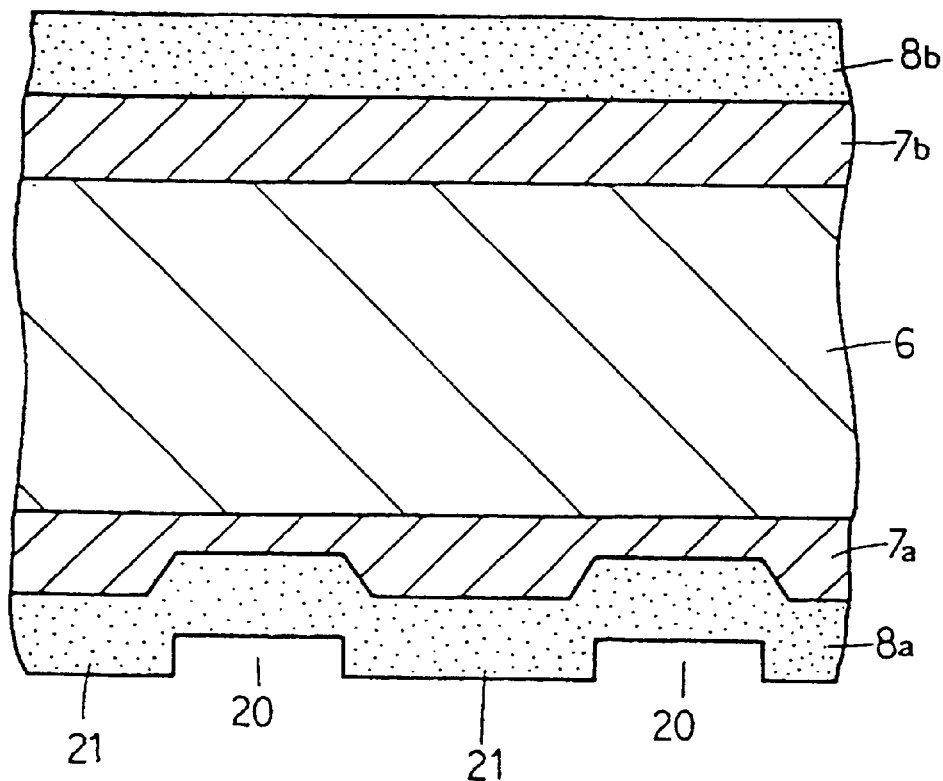
FIG. 5 is an enlarged sectional view illustrating a part of the floppy disk of the present invention.

In FIG. 3 there is seen a partially exploded perspective view of a magnetic disk cartridge. FIG. 4 is a plan view of the floppy disk of the present invention, which is housed in the magnetic disk cartridge. FIG. 5 is a partially enlarged sectional view of the floppy disk of the present invention. The magnetic disk cartridge, as shown in FIG. 3, mainly comprises a cartridge case 12, a floppy disk 13 rotatably housed in the cartridge case 12, and a shutter 14 slidably mounted in the cartridge case 12. The cartridge case 12 is formed of an upper case 12a and a lower case 12b. Though not shown, cleaning sheets are welded onto the inner surfaces of the cartridge case 12. An opening 15 through which a rotary drive shaft is inserted is formed in the nearly central portion of the upper case 12a, and a recess 16 is formed near the front side of the lower case 12b, for regulating the slide range of the shutter 14 mounted in the recess 16. Reference numeral 17 denotes a rectangular head insertion opening provided in the middle position of the recesses 16 of the upper case 12a and the lower case 12b.

The floppy disk 13 housed in such a cartridge case 1, as shown in FIG. 4, is of a doughnut shape and a metal or synthetic resin center hub 18 is mounted in the central hole thereof. As shown in FIG. 5, undercoat layers 7a and 7b containing non-magnetic powder and binder resin, and magnetic layers 8a and 8b containing magnetic powder and binder resin, are layered on both surfaces of the base film 6 by the above-described layering type coating method.

As shown in FIGS. 4 and 5, a great number of magnetic-head tracking optical tracks 20 are concentrically or spirally formed on the surface of the magnetic layer 8a by a stamper or by a laser cutting method, and data tracks are formed between two neighboring magnetic-head tracking optical tracks 20. The formation of such an undercoat layer 7a makes it possible to suppress the interference of light due to the thickness of the magnetic layer because light which enters into the magnetic layer out of projected light for the tracking servo is absorbed by the undercoat layer and the light entering into the detectors out of the reflected light for tracking is composed of only the reflected light from the surface of the magnetic layer when the tracking servo for the magnetic-head is performed by projecting light onto a great number of magnetic-head tracking optical tracks 20 formed on the surface of the magnetic layer 8a at predetermined intervals and onto the data tracks 21. Tracking of the magnetic-head can be satisfactorily performed without being influenced by variations in the thickness of the thinned magnetic layer 8a.

Examples of non-magnetic powder used in the undercoat layers 7a and 7b include superfine metal oxide powder such as $\alpha$-FeOOH, $\alpha$-Fe$_2$O$_3$ powder, TiO$_2$ powder, and ZrO$_2$ powder, and further calcium carbonate, barium carbonate, barium sulfate, talc, cilas, aluminum, tin, copper, acetylene black, and thermal black. Combinations of a plurality of these materials can be used for the same purposes.

Examples of a binder resin used in the undercoat layers 7a and 7b include a vinyl chloride-vinyl acetate copolymer, a cellulose resin, a polyvinyl butyral resin, an urethane resin, a polyester resin, and a radiation-curing resin, all of which are generally used in the magnetic recording medium.

Examples of an organic solvent include cyclohexanone, methyl ethyl ketone, methyl isobutyl ketone, ethyl acetate, benzene, toluene, xylene, tetrahydrofuron, and dioxane, all of which are suited to dissolve the binder resin used. The solvent may be used alone or in combination, mixed together without particular limitations.

Besides forming such an undercoat layer, light entering into the magnetic layer is absorbed by mixing in the magnetic layer a material which absorbs the projected light for optical servo tracking in order to suppress the light, except for that light reflected on the surface of the magnetic layer. Examples of materials absorbing such projected light include carbon blacks, such as acetylene black and thermal black, photoconductive materials, such as polymethine, quinone and porphine, and fine metal powder, such as $\alpha$-Fe.

Preferred examples of the base film 6 include a plastic film having physical properties of a Young's modulus of 400 to 700/kg/mm$^2$, such as a polyethylene terephthalate film, polyethylene naphthalate film, and polyamide film.

Examples of a magnetic powder used in the magnetic layers 8a and 8b include various conventional magnetic powders such as a hexagonal ferrite powder of $\gamma$-Fe$_2$O$_3$, Fe$_3$O$_4$ powder, Co-containing $\alpha$-Fe$_2$O$_3$ powder, Co-containing Fe$_3$O$_4$ powder, barium ferrite powder, strontium ferrite powder, CrO$^2$powder, Fe powder, Co powder, Fe-Ni powder, Co-Ni powder, and Co-P powder.

The binder resins and organic solvents used when the undercoat layers 7a and 7b are formed are also used in the magnetic layer 8a. Various additives which are usually used in a magnetic coating material, for example, a dispersing agent or a electric charge preventive agent, may be added as desired.

Examples of a polishing agent added to the magnetic layers 8a and 8b include aluminum oxide, chromium dioxide, silicon carbide and silicon nitride. The percentage of the addition thereof is preferably from about 0.1 to 25 wt. % relative to the magnetic powder.

Examples of a lubricant include higher fatty acids such as stearic acid, higher fatty esters thereof, liquid paraffin, squalene fluroresin and fluorine oil. Preferably, the percentage of addition of the lubricant is about 0.1 to about 25 wt. % to the magnetic powder.

Figure 9:
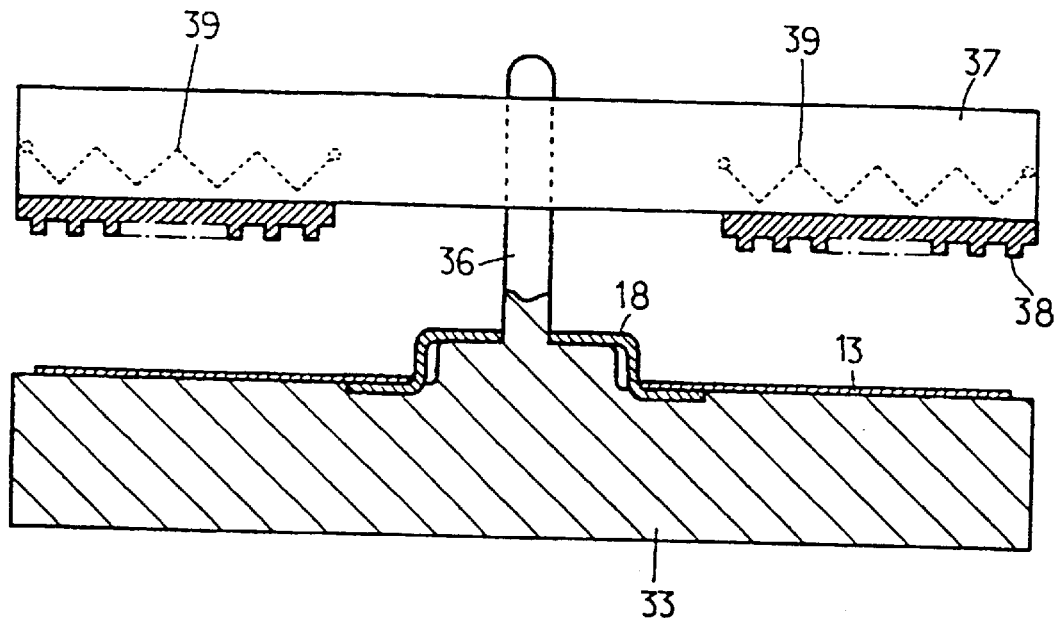
FIG. 9 is a sectional view illustrating an apparatus for forming a reference track and magnetic-head tracking optical tracks.
Figure 10:
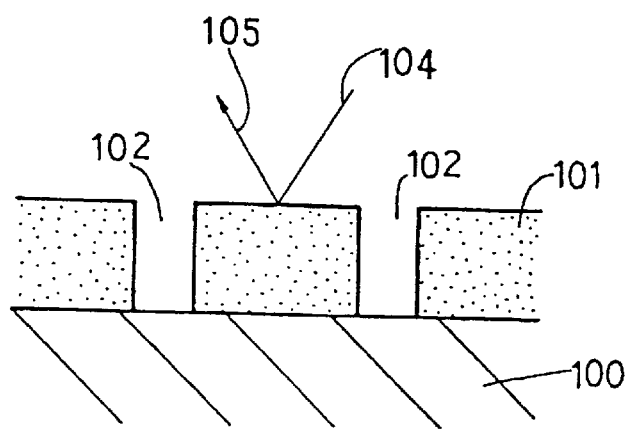
FIG. 10 is a partially enlarged sectional view of a conventional floppy disk.
Figure 11:
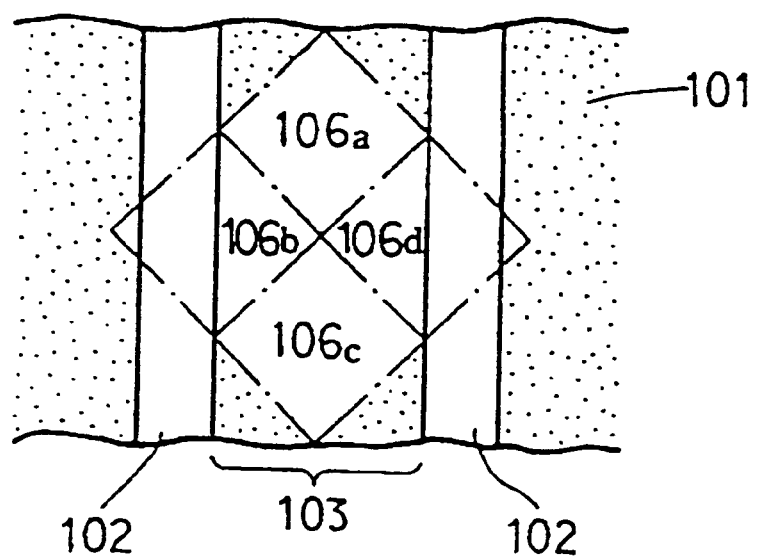
FIG. 11 is a partially enlarged plan view of the floppy disk shown in FIG. 10.

FIG. 9 illustrates the operation for forming the magnetic-head tracking optical tracks 20 on the surface of the magnetic layer 8a of the floppy disk 13 by stamping. The floppy disk 13, in which a center hub 18 is mounted, is set on a metal base 33. A center pin 36, which is to be inserted into a central hole 35 (See FIG. 4) of the center hub 18, protrudes from the base 33. The floppy disk 13 is located on the base by inserting the center pin 36 into the central hole 35 of the center hub 18. A stamper 37 is movably disposed above the base 33 in parallel thereto, and the vertical movement of the stamper 37 is guided by the center pin 36. A great number of small tooth portions 38 for forming the magnetic-head tracking optical tracks 20 are formed beneath the stamper 38. When the stamper 37 is lowered and the floppy disk 13 is pressed by a predetermined amount of pressure between the base 33 and the stamper 37, the small tooth portions 38 formed in the stamper 37 bite into the surface of the magnetic layer 8a, and the magnetic-head tracking optical tracks are formed by compression. The magnetic-head tracking optical tracks also can be formed by laser cutting. For example, the floppy disk 13 with the center hub 18 attached to it can be set onto a drive spindle in a laser cutting machine, and optical tracks having a width of 5 $\mu$m to 2 $\mu$m can be concentrically or spirally formed on the disc using argon or other lasers while the disk is being rotated.

Figure 6:
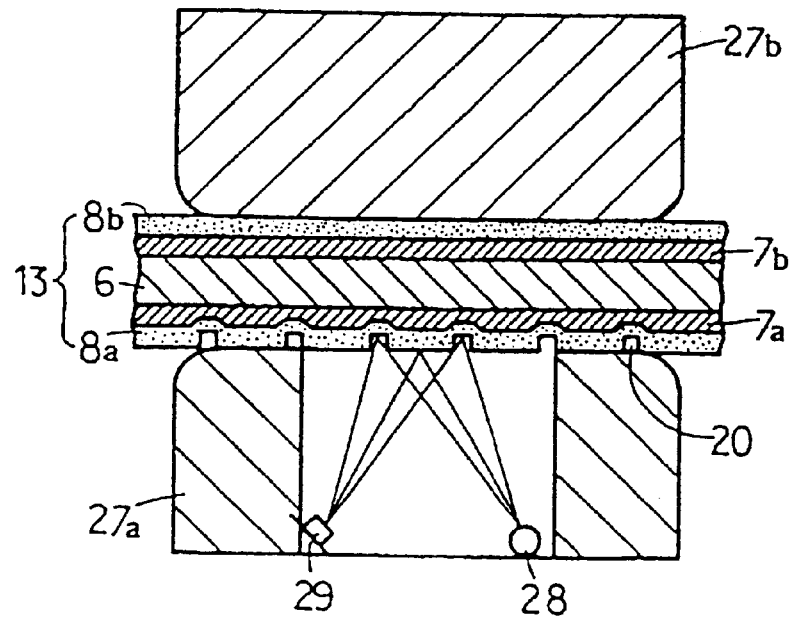
FIG.6 is a sectional view illustrating the tracking servo of the magnetic head.
Figure 7:
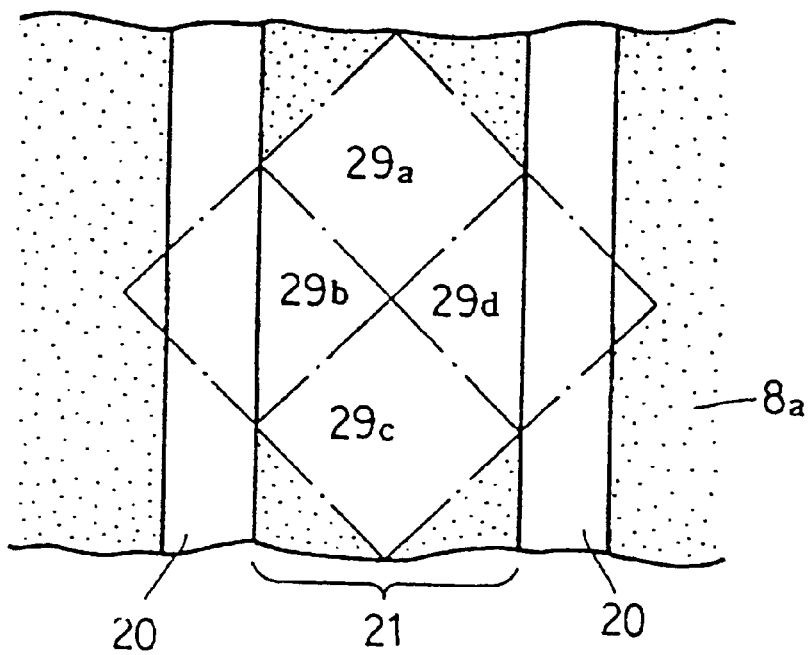
FIG. 7 illustrates a state in which light receiving elements are arranged.
Figure 8:
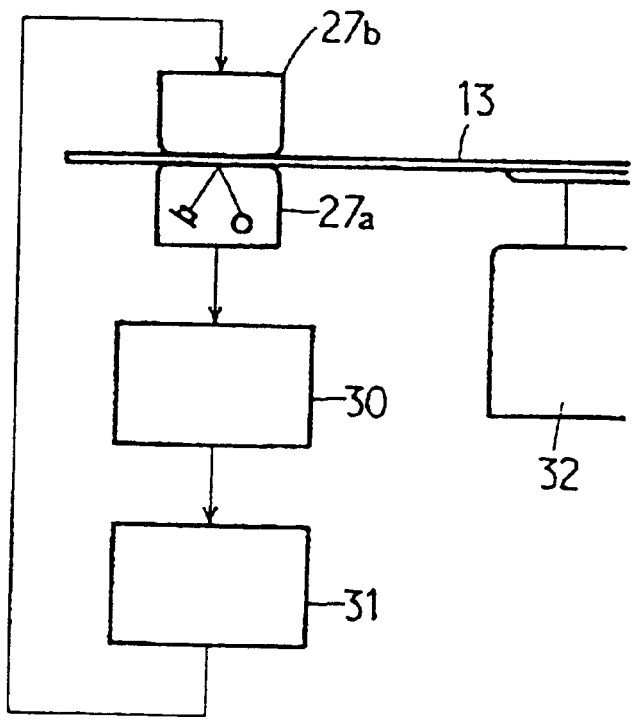
FIG. 8 is a sectional view illustrating magnetic head tracking control.

FIGS. 6 to 8 illustrate the tracking servo of the floppy disk 13. During recording/reproduction, the floppy disk is rotated in a condition in which it is sandwiched between magnetic heads 27a and 27b, as shown in FIG. 6. A light-emitting element 28 composed of an LED or the like for outputting light for tracking servo, and a light-receiving element group 29 for receiving reflected light from the magnetic layer 8a are integrally mounted on the magnetic head 27a. That portion where the light-emitting element 28 and the light-receiving element group 29 of the magnetic head 27a are mounted is open toward the floppy disk 13. The light-receiving element group 29, as shown in FIG. 7, is formed of four light-receiving elements 29a, 29b, 29c and 29d. Light reflected on the track 21 and the magnetic-head tracking optical tracks is received by these light-receiving elements 29a, 29b, 29c and 29d.

The output from each of the light-receiving elements 29a, 29b, 29c and 29d is input to a servo signal computing portion 30, as shown in FIG. 8. A position correction signal obtained by this servo signal computing portion is input to a head drive control section 31, and the tracking control of the magnetic head 27 is effected in accordance with a control signal from the head drive control section 31. Reference numeral 32 denotes a motor for rotating the floppy disk 13.

PREFERRED EMBODIMENTS

Composition of Magnetic Recording Material

| | |
|---|---|
| Barium ferrite magnetic powder (coercivity: 1,500 Oe, saturation magnetization: 60 emu/g, average particle size: 0.04 $\mu$m) | 500 parts by weight; |
| Vinyl chloride-vinyl acetate-vinyl alcohol copolymer (manufactured by Sekisui Chemical Co., Ltd.: Esrec E) | 55 parts by weight; |
| Polyurethane resin (manufactured by Nippon Polyurethane Industry Co., Ltd.: N-2301) | 33 parts by weight; |
| Trifunctional isocyanate cross-linking agent (manufactured by Nippon Polyurethane Industry Co., Ltd.: Coronate L); | 22 parts by weight; |
| Alumina (Manufacture by Sumitomo Chemical Co., Ltd.: AKP-28 | 50 parts by weight; |
| Oleyl oleate | 10 parts by weight; |
| cyclohexanone | 710 parts by weight; |
| Toluene | 710 parts by weight; |
| Methyl ethyl ketone | 950 parts by weight; |

The above composition was mixed and dispersed for 72 hours in a ball mill in order to prepare a magnetic coating material.

Next, the coating material 1 for the undercoat layer was discharged from a lower slit 4, and the magnetic coating material 2 was discharged from an upper slit 5 by using the extrusion type coating head 3 shown in FIG. 1. These materials were simultaneously coated onto the surface of the traveling polyethylene terephthalate base film 6 having a thickness of 62 $\mu$m and a width of 508 mm, and dried while being smoothed by a flexible member 11, thus forming the undercoat layer 7 and the magnetic layer 8. The obtained magnetic recording medium was heat-treated for 16 hours at 70° C. as it was an original sheet, after which it was stamped in the shape of a disk, and thus a 3.5-inch floppy disk was manufactured. The obtained floppy disk is set on the base 33 of the stamping apparatus shown in FIG. 9, and stamped by the stamper 37 under the conditions of a temperature of 40° C. and a pressure of 40 tons. Thus, magnetic-head tracking optical tracks 20 were formed and ten examples of disks, shown in Table 1 below, were manufactured. However, Example 9 was manufactured in the same way as example 3, except that only the magnetic powder was changed into a ferrous magnetic powder (coercivity: 1500 Oe, BET specific surface: 40 m$^2$/g).

Measurement of Light Transmittance of the Disk

The light (for example, laser light) having the same wavelength as that of the projected light for tracking servo is projected onto the manufactured 3.5-inch floppy disk from one side; and a power meter (Advantest: TQ810) is disposed on the opposite side, and thus, the quantity of light transmitted by the disk is measured. The quantity of light transmitted by the disk is expressed by a percentage.

Measurement of the Center Line Average Roughness of the Disk

The center line average roughness of the disk was measured in accordance with JIS Standard B0601.

In order to make the light transmittance of the disk less than 5%. The following measures were taken in Examples 2, 6, 7, 8 and 9, respectively.

EXAMPLE 2

The undercoat layer of 1.0 μm having the following composition was formed on the base film substrate.

| | |
|---|---|
| α-FeOOH (manufactured by Chitan Kogyo K.K.: Y-4V) | 400 parts by weight; |
| Carbon black (manufactured by Asahi Carbon Co., Ltd.: HS-500) | 100 parts by weight; |
| Vinyl chloride-vinyl acetate-vinyl alcohol copolymer (manufactured by Sekisui Chemical Co., Ltd.: Esrec E) | 83 parts by weight; |
| Polyurethane resin (manufactured by Nippon Polyurethane Industry Co., Ltd.: N-2301) | 50 parts by weight; |
| Trifunctional isocyanate cross-linking agent (manufactured by Nippon Polyurethane Industry Co., Ltd.: Coronate L) | 33 parts by weight; |
| Cyclohexane | 760 parts by weight; and |
| Toluene | 760 parts by weight; |

The above composition was mixed and dispersed for 72 hours in a ball mill in order to prepare a coating material for an undercoat layer.

EXAMPLE 6

Photoconductive phthalocyanine (manufactured by Dainippon Ink and Chemicals, Inc.: Fastogen Blue 8120) of 10 wt % against the barium ferrite magnetic powder was added in the magnetic layer.

EXAMPLE 7

Photoconductive phthalocyanine used in Example 6 of 10 wt % against the α-FeOOH was further added to the composition of the undercoat layer used in Example 6, and an undercoat layer having a thickness of 1.0 μm was formed.

EXAMPLE 8

The same undercoat layer as in Example 2, which has a thickness of 1.0 μm, was formed.

EXAMPLE 9

Except that ferrous magnetic powder was used instead of barium ferrite magnetic powder, the same undercoat layer as in Example 2, which has a thickness of 1.0 μm, was formed.

Overwrite Characteristics

The produced 3.5-inch floppy disk was loaded into a floppy disk drive (manufactured by NEC Corp.: FDD 1331). After 9 kfci (LF) has been written on the innermost track (Tr:239), 36 kfci (HF) is overwritten. The residual output of LF divided by the output of HF was measured as the overwrite characteristics.

Measurement of the Accuracy of Relative Track Location

The accuracy of the magnetic-head tracking optical tracks 20 was evaluated in the following way:

The data are written on the disk while it is rotated at 1000 rpm, and the read/write is repeated in a random access mode. When the data of $10^9$ bits were correctly written and read back, the mark of (0) was put. However, the mark of (X) was put if any servo tracking error was found before the reading reaches $10^9$ bits.

The various conditions in some examples of the present invention are shown in Table 1, and the evaluation of the accuracy of the relative track location is shown in Table 2. However, BaFe and Metal in the Tables denotes barium ferrite magnetic powder and ferrous magnetic powder respectively.

TABLE 1

| Example No. | Magnetic Layer | Thickness of Magnetic Layer (nm) | Wavelength of Projected Light (nm) | Track Density (TPI) | Light Transmittance of disk % | Center Line Average Roughness of Disk (nm) |
|---|---|---|---|---|---|---|
| 1 | BaFe | 1100 | 780 | 2400 | 10.6 | 12 |
| 2 | BaFe | 700 | 780 | 2400 | 2.8 | 12 |
| 3 | BaFe | 700 | 780 | 2400 | 5.5 | 12 |
| 4 | BaFe | 500 | 780 | 2400 | 7.2 | 12 |
| 5 | BaFe | 700 | 780 | 3000 | 5.3 | 12 |
| 6 | BaFe | 700 | 780 | 2400 | 4.5 | 12 |
| 7 | BaFe | 400 | 780 | 2400 | 3.9 | 12 |
| 8 | BaFe | 700 | 780 | 2400 | 3.7 | 20 |
| 9 | Metal | 700 | 780 | 2400 | 3.2 | 12 |

TABLE 2

| Example No. | Magnetic Layer | Accuracy of Relative Track Location* | Overwrite Characteristics (dB) |
|---|---|---|---|
| 1 | BaFe | 0 | −22 |
| 2 | BaFe | 0 | −32 |
| 3 | BaFe | X | −32 |
| 4 | BaFe | X | −36 |

TABLE 2-continued

| Example No. | Magnetic Layer | Accuracy of Relative Track Location* | Overwrite Characteristics (dB) |
|---|---|---|---|
| 5 | BaFe | X | −32 |
| 6 | BaFe | 0 | −32 |
| 7 | BaFe | 0 | −38 |
| 8 | BaFe | X | −32 |
| 9 | Metal | 0 | −32 |

*X = There is no tracking accuracy, since servo tracking error was found before the data of $10^9$ bits could be correctly written and read back.
0 = The tracking is accurate, since the data of $10^9$ bits could be correctly written and read back.

As can be seen from the above Tables 1 and 2, the floppy disks obtained in Examples 1, 2, 6, 7, and 9 have a magnetic layer, and the wavelength of the projected light for servo tracking in comparison with the floppy disks obtained in Examples 3, 4 and 5 have less light transmittance (<5%) and in comparison with Example 8 have a smaller surface roughness (i.e., less than $\frac{1}{50}$ of the wavelength of the projected light), even though their track density is over 1000 TPI. Thus, the floppy disk obtained in this invention possess low servo noise, a good tracking accuracy and excellent overwrite characteristics.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims The following claims are to be accorded the broadest interpretation, so as to encompass all such modification and equivalent structures and functions.

We claim:

1. A magnetic recording disc medium comprising:

a flexible substrate having a first and a second surface, an undercoat layer containing a non-magnetic powder and a binder resin coated on said first surface of said flexible substrate, a magnetic layer for recording information, containing magnetic powder dispersed in a binder resin coated on said undercoat layer, a multiplicity of magnetic-head tracking recesses formed on an exposed surface of said magnetic layer at predetermined intervals, and data tracks for recording thereon information provided between every two adjacent magnetic-head tracking recesses, each tracking recess and each data track having a function to track a magnetic head in accordance with reflected light from said magnetic-head tracking recesses when a light of a specific wavelength for optical servo tracking is projected on said tracking recesses and said data tracks, wherein the magnetic layer contains a powder or resin which absorbs the projected light, the thickness of the magnetic layer is less than said wavelength of said projected light, the center line average roughness of the magnetic layer is less than $\frac{1}{50}$ of the wavelength of said projected light, the data tracks are provided at a track density greater than 1000 TPI, and the light transmittance of said magnetic recording medium is less than 5%.

2. The magnetic recording medium according to claim 1, wherein light transmittance of said medium is less than 3%.

3. The magnetic recording medium according to claim 1, wherein track density of said data tracks is greater that 2000 TPI.

* * * * *